United States Patent [19]

Choi

[11] Patent Number: 5,724,205
[45] Date of Patent: Mar. 3, 1998

[54] AUTOMATIC TRACKING CONTROL DEVICE WHICH USES DIFFERENT WEIGHTINGS WITH A NUMBER OF INCORRECTABLE, CORRECTABLE, AND NON-ERRORS

[75] Inventor: Man Chul Choi, Seoul, Rep. of Korea

[73] Assignee: Goldstar Co., Ltd., Seoul, Rep. of Korea

[21] Appl. No.: 545,379

[22] Filed: Oct. 19, 1995

Related U.S. Application Data

[63] Continuation of Ser. No. 214,514, Mar. 18, 1994, abandoned.

[30] Foreign Application Priority Data

Mar. 19, 1993 [KR] Rep. of Korea ............... 1993-4297
Mar. 19, 1993 [KR] Rep. of Korea ............... 1993-4298

[51] Int. Cl.$^6$ ............................................. G11B 5/584
[52] U.S. Cl. ............................. 360/77.13; 360/77.12
[58] Field of Search ........................ 360/77.01, 77.04, 360/77.07, 77.12, 77.13, 38.1, 53, 73.14

[56] References Cited

U.S. PATENT DOCUMENTS

| | | | |
|---|---|---|---|
| 4,947,272 | 8/1990 | Yokozawa | 360/77.15 |
| 4,951,282 | 8/1990 | Mester | 360/77.12 |
| 4,977,469 | 12/1990 | Yokozawa | 360/77.01 |
| 5,121,263 | 6/1992 | Kerwin et al. | 360/53 |
| 5,233,487 | 8/1993 | Christensen et al. | 360/77.05 |
| 5,253,130 | 10/1993 | Kaaden et al. | 360/77.15 |
| 5,287,225 | 2/1994 | Sukigara | 360/77.12 |
| 5,303,093 | 4/1994 | Kawasaki | 360/53 X |
| 5,309,299 | 5/1994 | Crossland et al. | 360/77.12 |
| 5,448,430 | 9/1995 | Bailey et al. | 360/77.01 X |
| 5,510,938 | 4/1996 | Sakakibara et al. | 360/77.12 X |

OTHER PUBLICATIONS

"Video Compression Makes Big Gains", Ang et al., IEEE Spectrum, Oct. 1991, pp. 16–19.

*Primary Examiner*—Aristotelis M. Psitos
*Assistant Examiner*—Larry T. Cullen
*Attorney, Agent, or Firm*—Bell, Boyd & Lloyd

[57] ABSTRACT

This invention relates to automatic tracking devices of digital VCRs which is provided to have a capability of precise control of the tracking by detecting rate of error due to variation of tracking of a rotating head. The devices comprise a pre-amplification part for amplifying reproduction signals scanned at a rotating head of a head drum to any level in reproduction, a modulation and demodulation part for restoring amplified reproduction signals in the pre-amplification part into digital signals, a format and deformat part for arraying the digital signals restored in the modulation and demodulation part to original signals, an error correction part for detecting presence of errors caused during recording in the digital signals arrayed by the format and deformat part and generating correctable and incorrectable control signals according to the rate of error detected, and an automatic tracking control part for controlling the tracking through a servo system by generating tracking data according to the rates of error obtained through addition of different weightings to each of the control signals transmitted thereto from the error correction part.

4 Claims, 8 Drawing Sheets

AUTOMATIC TRACKING CONTROL DEVICE WHICH USES DIFFERENT WEIGHTINGS WITH A NUMBER OF INCORRECTABLE, CORRECTABLE, AND NON-ERRORS

This is a continuation of application Ser. No. 08/214,514, filed on Mar 18, 1994 now abandoned.

FIELD OF THE INVENTION

This invention relates to digital VCRs(Video Cassette Tape Recorders), more particularly to automatic tracking devices of digital VCRs which is provided to have a capability of precise control of the tracking by detecting rate of error due to variation of tracking of a rotating head.

BACKGROUND OF THE INVENTION

In general, in an analogue VCR, rotating heads attached on a head drum trace a recording medium and scan reproduction signals to detect envelopes, according to which envelopes, an automatic tracking control is performed by controlling speed and phase of a capstan motor.

The foregoing automatic tracking control system of an analogue VCR, as shown in FIG. 1, includes a head drum 100 having rotating heads attached thereon for scanning video high frequency signals and high fidelity(Hi-Fi) audio high frequency signals of a video tape, a first and a second envelope detection parts 103 and 104 for respectively detecting envelopes of video signals and Hi-Fi audio signals amplified in a video pre-amplifier 101 and a Hi-Fi pre-amplifier 102 amplifying the video signals and Hi-Fi audio signals having been scanned at the rotating heads of the head drum 100 to a predetermined level, respectively, a first and a second analogue/digital conversion parts 105 and 106 convening the video envelope signals and the Hi-Fi envelope signals detected in the first and the second envelope detection parts 103 and 104 into digital signals, respectively, a first and a second integrators 107 and 108 integrating the digital signals transmitted thereto from the first and the second analogue/digital conversion parts 105 and 106 according to a head switching signal cycle and transmitting therefrom, a first and a second digital filter parts 109 and 110 filtering the video envelope data and the Hi-Fi audio envelope data integrated in the first and the second integrators 107 and 108 and transmitting therefrom, an automatic tracking processing part 111 processing the video envelope data and the Hi-Fi audio envelope date filtered in the first and the second digital filter part 109 and 110 in response to up/down automatic tracking key signals of a key pad 112 to convert into tracking data, and a servo system 113 controlling the tracking of the rotating heads by controlling speed and phase of a capstan motor according to the tracking data transmitted thereto from the automatic tracking processing part 111.

In an automatic tracking control system of an analogue VCR having foregoing construction, the rotating head attached on the head drum 100, tracing video tracks and Hi-Fi tracks of a video tape, scans the video high frequency signals having a band width of 1 MHz to 10 MHz and the Hi-Fi audio signals having a band width of 1 MHz to 2 MHz having been recorded in the tape and transmits to the video pre-amplifier 101 and Hi-Fi pre-amplifier 102 therefrom, respectively.

The video pre-amplifier 101 and the Hi-Fi pre-amplifier 102 amplify the transmitted video signals and the H i-Fi audio signals to any level and transmit to the first and the second envelope detection parts 103 and 104 therefrom.

The first and the second envelope detection parts 103 and 104, detecting the transmitted video signals and Hi-Fi audio signals having been amplified to any level, detect the greatest envelope and transmit to the first and the second analogue/digital conversion parts 105 and 106 therefrom.

The first and the second analogue/digital conversion parts 105 and 106 convert each of the analogue video envelope signals and the Hi-Fi envelope signals detected in the first and the second envelope detection part 103 and 104, and transmit to the first and the second integrators 107 and 108 therefrom, which integrators 107 and 108 integrate the transmitted video and Hi-Fi envelope signals having converted into digital signals according to the cycles of the head switching signals and transmit to the first and the second digital filter parts 109 and 110 therefrom.

The first and the second filter parts 109 and 110, adding and multiplying the video and the Hi-Fi envelope signals integrated in the first and the second integrators 107 and 108 for one field portion, transmit to the automatic tracking processing part 111 therefrom.

The automatic tracking processing part 111 converts the video and the Hi-Fi envelope data transmitted thereto from the first and the second digital filter parts 109 and 110 into tracking data in response to the automatic tracking key signals of the key pad 112, and transmits to the servo system 113 therefrom, and the servo system 113, shifting the position of a reference signal for one frame in response to the transmitted tracking data, controls the tracking automatically, changing speed and phase of a capstan motor.

However, because the way of tracking control of such a foregoing automatic tracking control system of an analogue VCR is by detecting the envelopes of the video and the Hi-Fi of the analogue reproduced at the rotating heads and by converting to digital signals after making the envelopes the greatest, it has problems of being complicated in view of construction due to the addition of means for detecting the envelopes and for converting the envelopes into digital signals, and of integrator digital filter parts.

Moreover, such a foregoing automatic tracking control system of an analogue VCR has problems of being troublesome in that, for detecting linearity of the recording medium, a user has to cut a part of the recorded tape personally and, after application of magnetic fluid thereon, has to check astray of linearity thereof with a microscope, and of being non-economical in that much time is consumed in grasping all outlines.

SUMMARY OF THE INVENTION

The object of this invention is to provide an automatic tracking control device which is provided to have a capability of precise control of the tracking by adding different weightings to tracking errors according to rate of the tracking error due to tracking variations of a rotating head.

Another object of this invention is to provide an automatic tracking control device which is provided to have a capability of precise detection of linearities between a rotating head and a recording medium by recording data error correction codes having been added thereto, and, in reproduction, analyzing tracking error while varying the tracking of the recording medium.

Still another object of this invention is to provide a method for detecting linearity, which can detect the linearity between a rotating head and a recording medium precisely.

These and other objects and features of this invention can be achieved by providing an automatic tracking control device of a digital VCR including a pre-amplification means for amplifying reproduction signals scanned at a rotating head of a head drum to any level in reproduction, a modulation and demodulation means for restoring amplified reproduction signals in the pre-amplification means into digital signals, a format and deformat means for arraying the digital signals restored in the modulation and demodulation means to original signals, an error correction means for detecting presence of errors caused during recording in the digital signals arrayed by the format and deformat means and generating correctable and incorrectable control signals according to the rate of error detected, and an automatic tracking control means for controlling the tracking through a servo system by generating tracking data according to the rates of error obtained through addition of different weightings to each of the control signals transmitted thereto from the error correction means.

And these and other objects and features of this invention can be achieved by providing a linearity detection device of a rotating head recording medium including a control means for fine varying of a tracking position of a rotating head against a tape and for controlling operations of total system, a pro-amplification means for amplifying reproduced signals of the rotating head according to the tracking position variation of the control moans in reproduction, a format and deformat means for restoring the reproduction signals amplified in the pre-amplification means into original digital signals, an error correction code addition and separation means for separating video data and error correction codes from the digital signals transmitted thereto from the format and deformat means and transmitting therefrom as well as adding error correction codes to the video data applied from outside in recording and recording on a recording medium through the format and deformat means, the pre-amplification means and the rotating head, a memory means for storing error signals separated in and transmitted thereto from the error correction code addition and separation means in response to the control signals of the control means and a linearity analyzing means for finding edges of an error data having stored in the memory means and connecting two edge lines, and a finding center line of the connected two lines and displaying the found line on a frame.

And these and other objects and the features of this invention can be achieved by providing a method for linearity detection of a rotating head recording medium including steps of varying tracking position of a rotating head against a tape by varying the tracking data in reproduction, storing error signals generated according to the variation of the tracking position of the rotating head up to a preset number, and calculating linearity of the recording medium with the stored error data and displaying the calculated linearity.

DETAILED DESCRIPTION OF THE INVENTION

Figure 1:
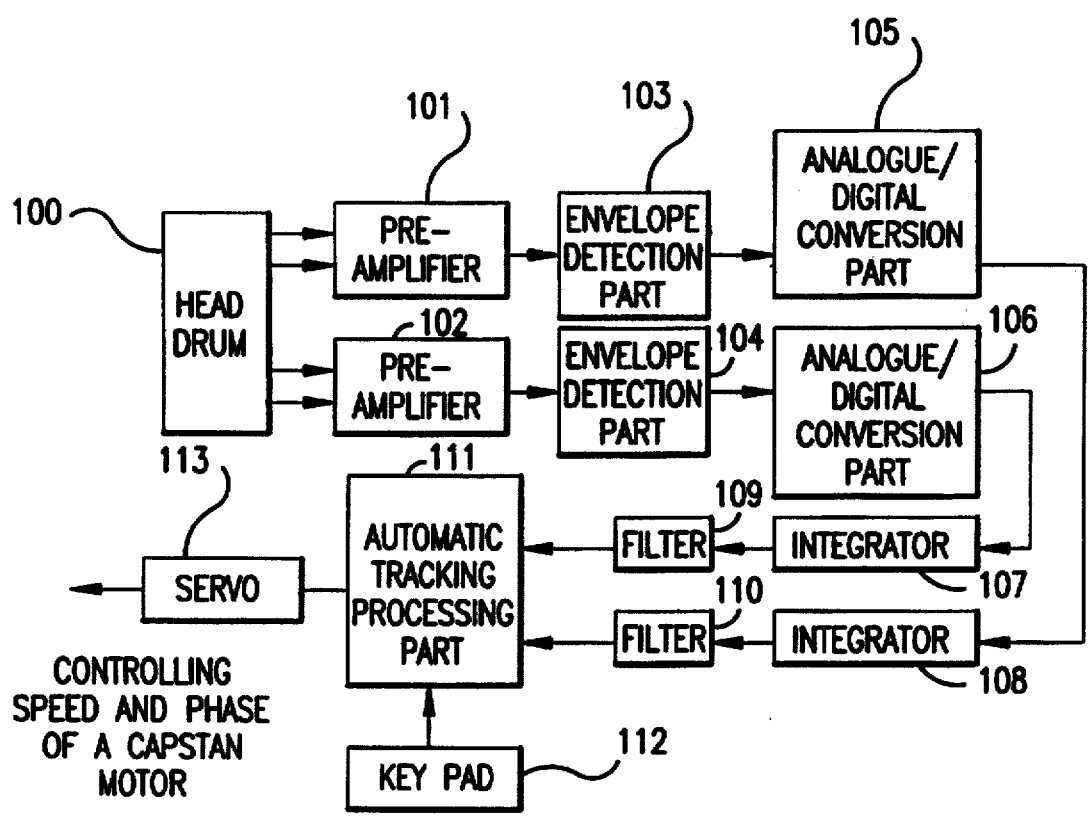
FIG. 1 shows a block diagram of an automatic tracking control device of a conventional analogue VCR.
Figure 2:
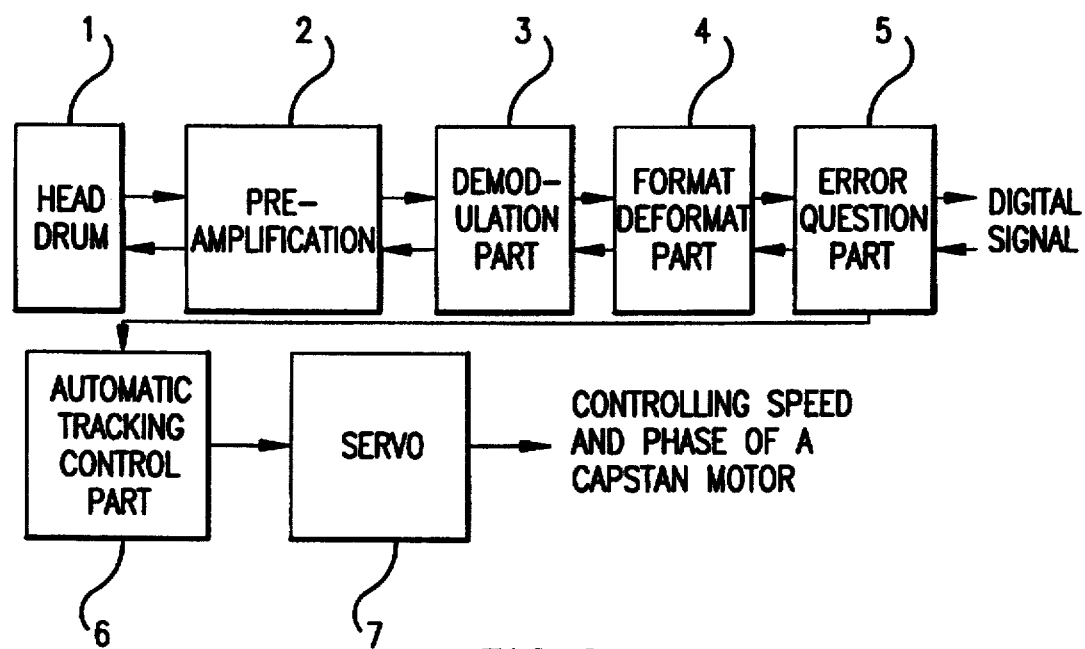
FIG. 2 shows a block diagram of an automatic tracking control device of a digital VCR in accordance with a first embodiment of this invention.

Shown in FIG. 2 is a block diagram of an automatic tracking control device of a digital VCR according to a first embodiment of this invention including a pre-amplification part 2 for amplifying reproduction signals scanned at a rotating head of a head drum 1 to any level in reproduction, a modulation and demodulation part 3 for restoring amplified reproduction signals in the pre-amplification part 2 into digital signals, a format and deformat part 4 for arraying the digital signals restored in the modulation and demodulation part 3 to original signals, an error correction part 5 for detecting presence of errors caused during recording in the digital signals arrayed by the format and deformat part 4 and generating control signals according to the rate of error detected, and an automatic tracking control part 6 for adding different weightings to each of the control signals transmitted thereto from the error correcting part 5 according to the rate of error, and transmitting the tracking data therefrom, and a servo system 7 for controlling speed and phase of a capstan motor according to the tracking data transmitted thereto from the automatic tracking control part 6.

Figure 3:
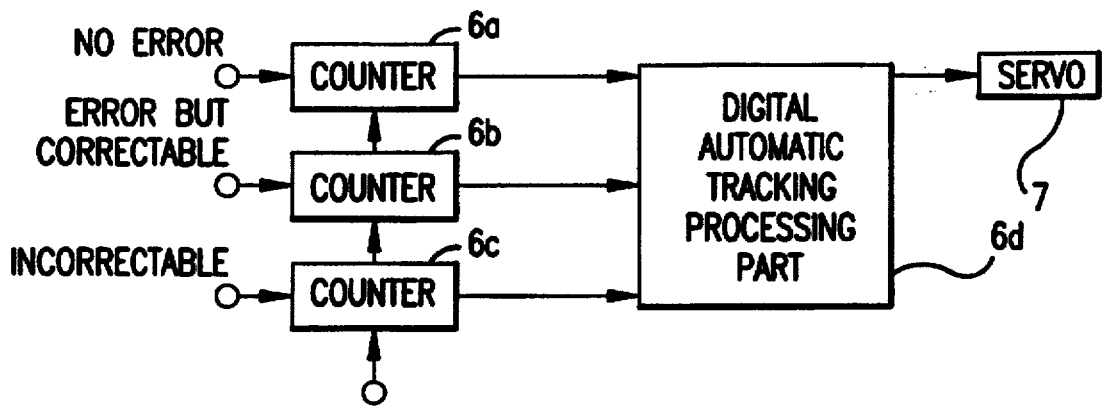
FIG. 3 shows a detail block diagram for an automatic tracking control part of FIG. 2.

The automatic tracking control part 6, as shown in FIG. 3, has a first, a second and a third counter parts 6a, 6b and 6c for counting control signals having no errors, having errors but correctable and having errors incorrectable after synchronizing to vertical synchronization signals, and a digital automatic tracking processing part 6d for generating tracking data by processing the counted values in the first to the third counter parts 6a to 6b.

Figure 4:
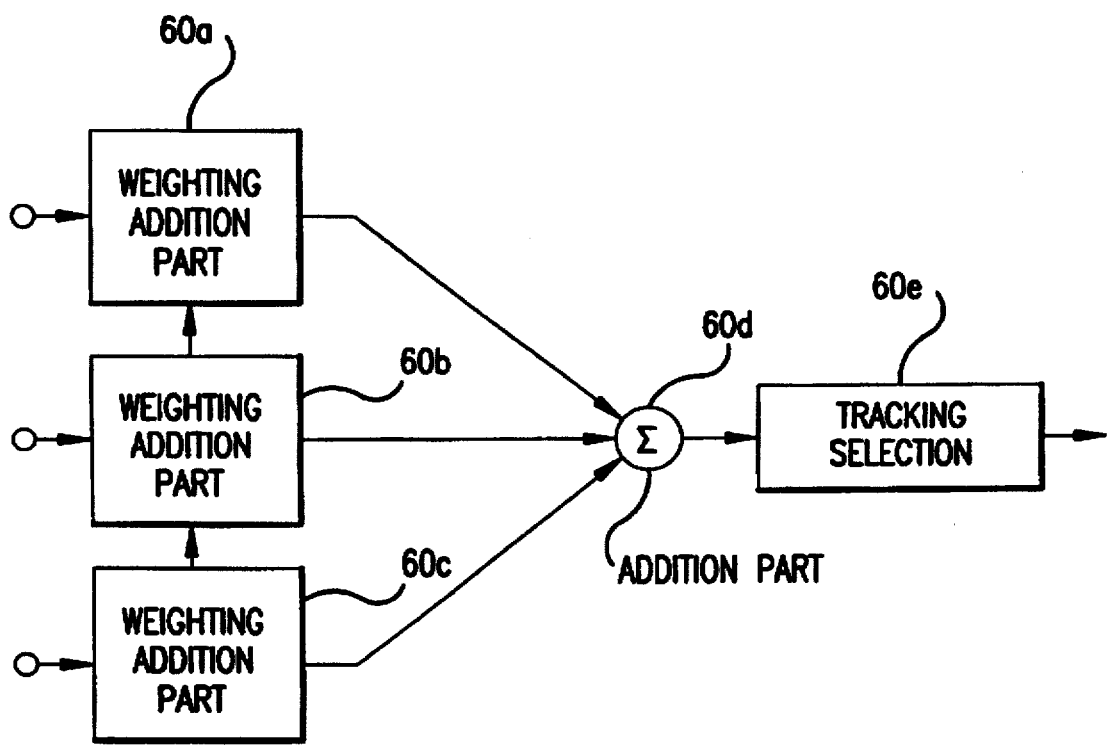
FIG. 4 shows a detail block diagram for a digital automatic tracking processing part of FIG. 3.

As shown in FIG. 4, the digital automatic tracking processing part 6d has a first to a third weighting addition parts 60a to 60c for adding weightings to each of the counted values transmitted thereto from the first to the third counter parts 6a to 6c, an addition part 60d for adding the error signals the weightings having been added thereto in the first to the third weighting addition part 60a to 60c, and a tracking selection part 60e for selecting tracking data transmitted thereto from the addition part 60a according to the rate of error and transmitting to a servo system 7 therefrom.

Operation of the device shown in FIG. 2 is to be explained hereinafter.

In reproduction, the video heads and the audio heads attached on the head drum 1 scan video signals and audio signals recorded on video tracks and audio tracks of a video tape, respectively and transmit to the pre-amplification part 2, and the pre-amplification part 2 amplifies the transmitted reproduction signals to any level and transmits to the demodulation part 3 therefrom.

The demodulation part 3 restores the reproduction signals amplified in and transmitted thereto from the pre-amplification part 2 into original digital signals and transmits to the format and deformat part 4 therefrom, and the format and deformat part 4 arrays the digital signals demodulated and transmitted thereto into original signals and transmits to the error correction part 5 therefrom.

The error correction part 5 restores the errors caused in recording of the digital signals transmitted thereto from the format and deformat part 4 and transmits as a digital signals therefrom as well as detects and corrects errors from the digital signals transmitted thereto from the format and deformat part 4.

In this time, when the rate of error detected from the digital signals is within the limit of correctable range, the errors are corrected, and when the rate is out of correctable range, a control signal indicating that the errors are incorrectable is generated and the error correction can not be carried out.

Figures 5, 6:
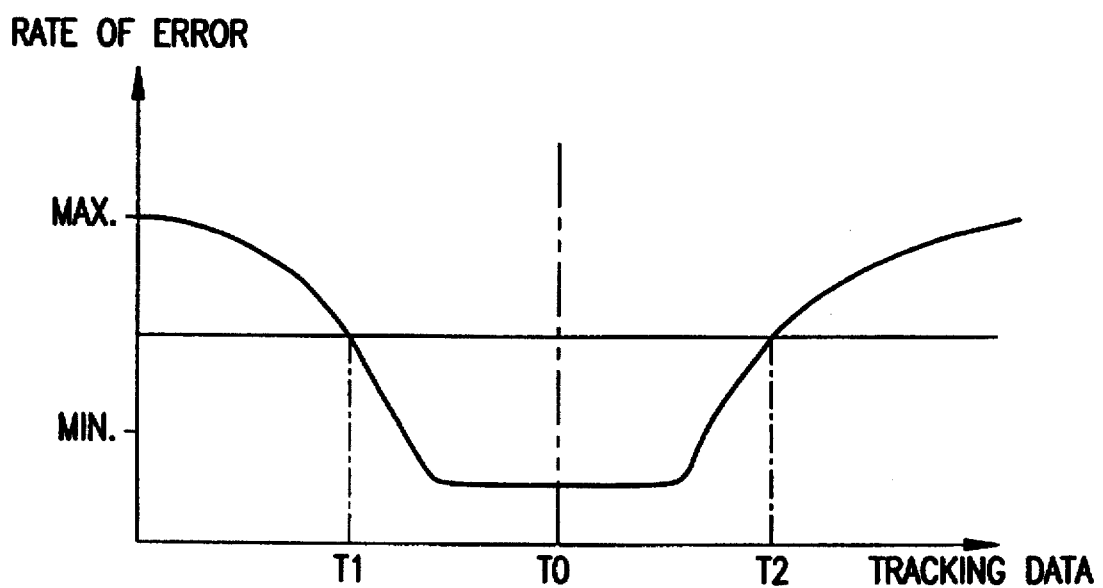
FIG. 5 explains a control signal of an error correction part of FIG. 2.
FIG. 6 is a graph explaining a variation of error according to a variation of tracking.

Accordingly, the error correction part 5 transmits control signals corresponding to cases of having no errors(no error signal), having errors but correctable(correctable signal) and having errors incorrectable(incorrectable error signal) to the first to the third counter parts 6a to 6c of the automatic tracking control part 6 (See FIG. 5).

The first to the third counter Dart 6a to 6c synchronize the control signals ie., no error signals, correctable error signals and incorrectable error signals transmitted thereto from the error correction part 5, to vertical synchronization signals vs and count therein, and transmit to the first to the third weighting addition part 60a to 60c of the digital automatic tracking process part 6d therefrom.

In this time, in order to minimize degradation of images by minimizing the incorrectable errors, the first to the third weighting addition parts 60a to 60c of the digital automatic tracking process part 6d multiply weightings to the numbers of having no errors, having errors but correctable and having errors incorrectable, respectively counted by and transmitted thereto from the first to the third counter parts 6a to 6c, respectively. In this time, the greatest weighting is added to the number having incorrectable errors, and the less weightings are added to the numbers having the less errors, which are transmitted to the addition part 60d.

The addition of weightings is proportional to the number of errors which have incorrectable errors.

The addition part 60d adds the amount of error of the signals weightings having been added thereto by the first to the third weighting addition parts 60a to 60c and transmits the added amount of error to a tracking selection part 60e therefrom.

The tracking selection part 60e, as shown in FIG. 6, selects tracking data about the portions having the least errors ie., having no incorrectable errors(a section between T1 and T2 ) of the errors transmitted thereto from the addition part 60d and transmits to the servo system 7 therefrom.

The servo system 7, controlling the speed and the phase of a capstan motor according to the tracking data transmitted thereto from the tracking selection part 60e, carries out the most optimum tracking.

On the other hand, in recording, a reverse process in which errors of the digital signals transmitted thereto are corrected in the error correction part, modulated in the format and deformat part, amplified in the pre-amplification part, and recorded in a video tape, of the Process in reproduction is carried out.

Figure 7:
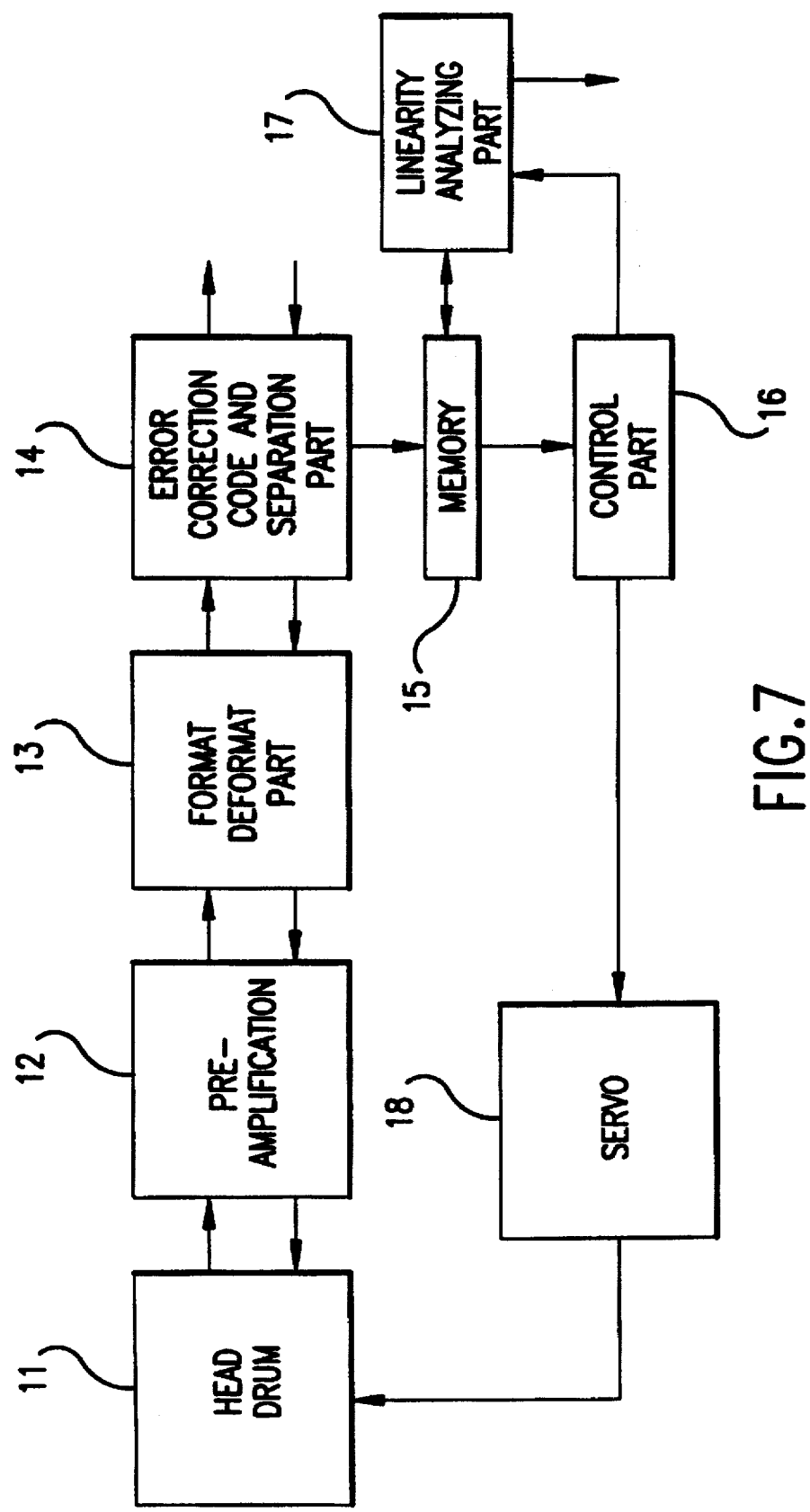
FIG. 7 shows a block diagram of an automatic tracking control device of a digital VCR in accordance with another embodiment of this invention.
Figure 8:
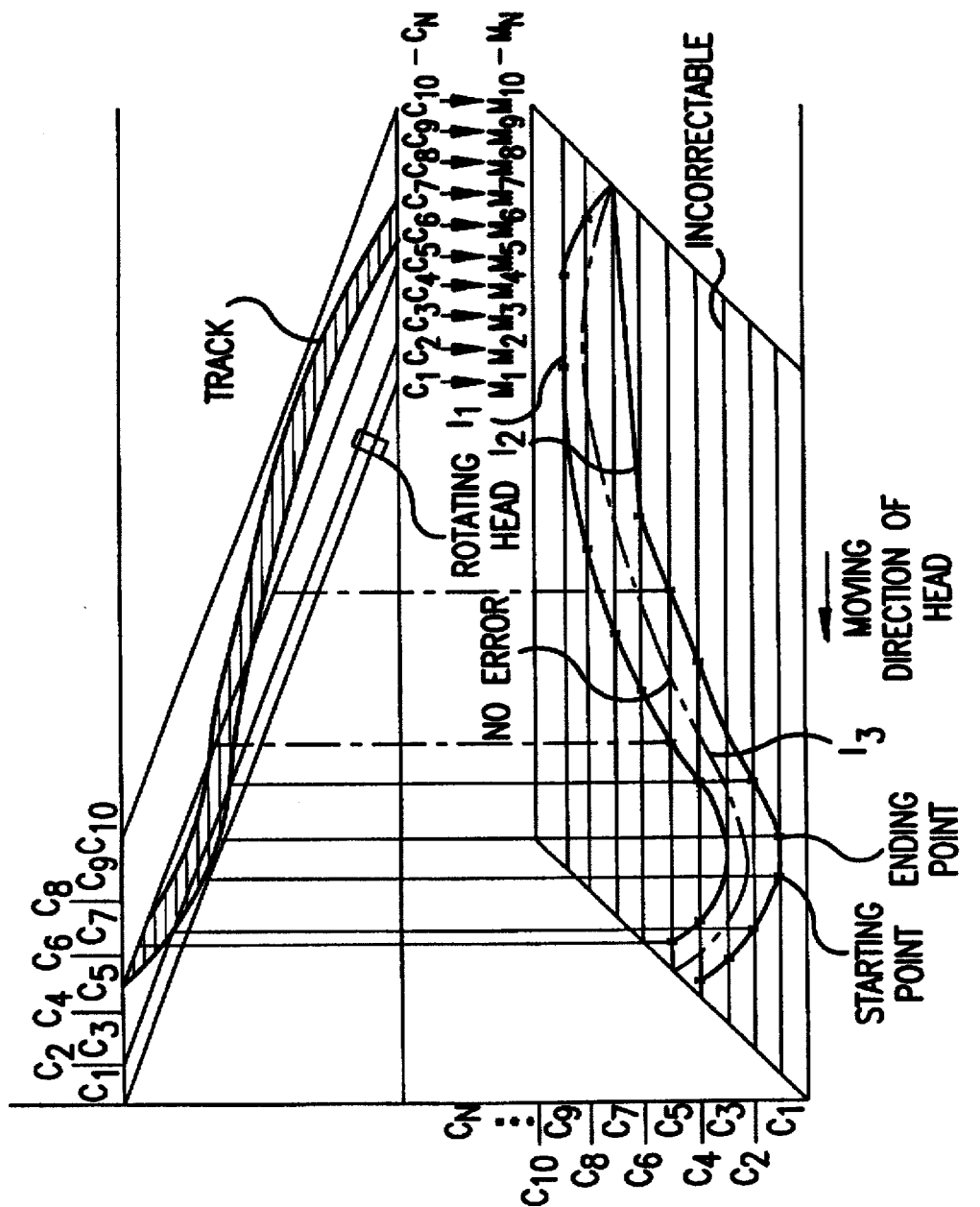
FIG. 8 explains error generating positions according to variation of tracking of FIG. 7.
Figure 9:
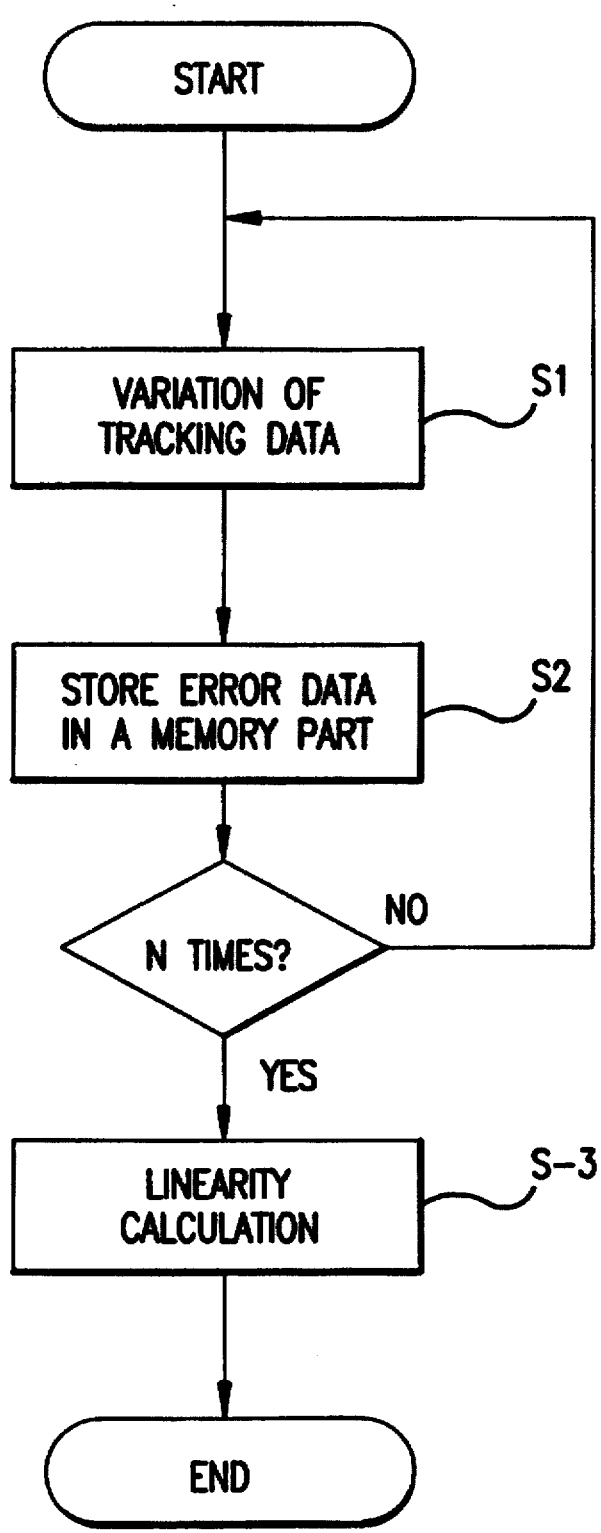
FIG. 9 is a flow chart explaining over all operations of FIG. 7.

FIG. 7 is a block diagram showing an automatic tracking device of a digital VCR in accordance with another embodiment of this invention including a control part 16 for controlling all the operation of a system and converting and transmitting the tracking data, a servo part 18 for fine variation of the tracking position of a rotating head of a head drum 11 against a tape by controlling speed and phase of a capstan motor according to the tracking data converted in and transmitted from the control part 16 in reproduction and recording, a pre-amplification part 12 for amplifying reproduction signals recorded in the tape and transmitted thereto to any level according to the variation of the tracking position by the servo part 18 and transmitting therefrom, a format and deformat part 13 for restoring reproduction signals amplified in the pre-amplification part to original digital signals in reproduction and for converting form of the data to suite to a recording format of a recording medium in recording, an error correction code addition and separation part 14 for separating video data and error correction codes of the digital signals transmitted thereto from the format and deformat part 13 and transmitting therefrom, and in recording, for adding error correction codes to the video data applied transmitted thereto from outside and recording the added data on a recording medium through the pre-amplification part 12 and a rotating head, a memory part 15 for storing the error signals separated in and transmitted thereto from the error correction code addition and separation part 14 in a corresponding address according to an assignment of address by the control part 16, and a linearity analyzing part 17 for analyzing linearity of the tape at reading in error data stored in the memory part 16 and displaying on a frame.

The operation of FIG. 7 is to be explained in detail hereinafter, referring to FIGS. 8 to 11.

First, when a rotating head attached on a head drum 11 scans reproduction signals recorded on a recording medium and transmits to the pre-amplification part 12 therefrom, the pre-amplification part 12 amplifies the reproduction signals scanned in and transmitted thereto from the rotating head to a predetermined level and transmits to the format and deformat part 13 therefrom.

The format and deformat part 13 restores the reproduction signals transmitted thereto to the original digital signals and transmits to the error correction code addition and separation part 14 therefrom.

The error correction code addition and separation part 14 separates the video data and the error correction codes from the digital signals having passed through the format and deformat part 13 and transmits therefrom, and, when a recording of data on a recording medium is required, adds error correction codes to the video data applied from outside and records on the recording medium after making to pass through the format and deformat part changing form of the data to match the recording format of the recording medium, the pre-amplification part and the rotating head of the head drum 11.

In a reproduction process of a tape recorded as the foregoing description, to detect linearity of the tape, the control part 16 at first varies the tracking data C1, C2 . . . Cn and transmits to the servo part 18 therefrom. (S-1)

The servo part 18, controlling speed and phase of a capstan motor according to the tracking data transmitted thereto, varies the tracking position of the rotating head against the tape finely.

Accordingly, the error correction code addition and separation part 14, separating each error signals due to the variation of tracking, stores in addresses M1, M2 , . . . Mn of the memory part 15. (S-2)

The control part 16, once the error data transmitted thereto from the error correction code addition and separation part 14 having been stored up to a preset number to the memory part 15, controls the memory part 15 to transmit the stored error data to the linearity analyzing part 17.

Figure 10:
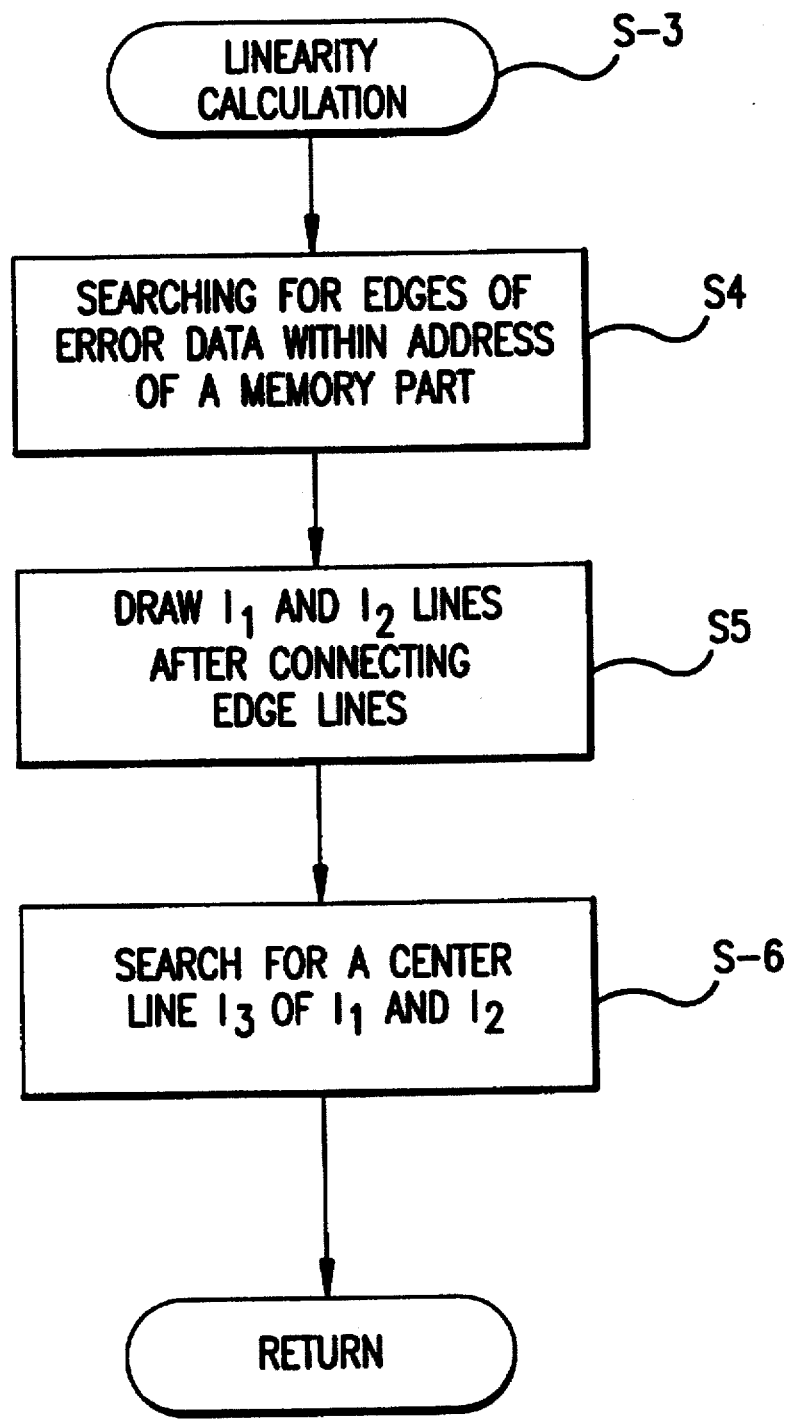
FIG. 10 is a flow chart explaining a linearity calculation of FIG. 9.

The linearity analyzing part 17 carries out a calculation of the linearity of the tape with the error data transmitted thereto from the memory part 15. (S-3) That is, as shown in FIG. 10, the linearity analyzing part 17 detects edges of the error data transmitted thereto from the memory part 15, connects the lines 11 and 12 of the detected edges, and detects the center line 13 about the lines 11 and 12. (S-4; S-5; S-6)

Figure 11:
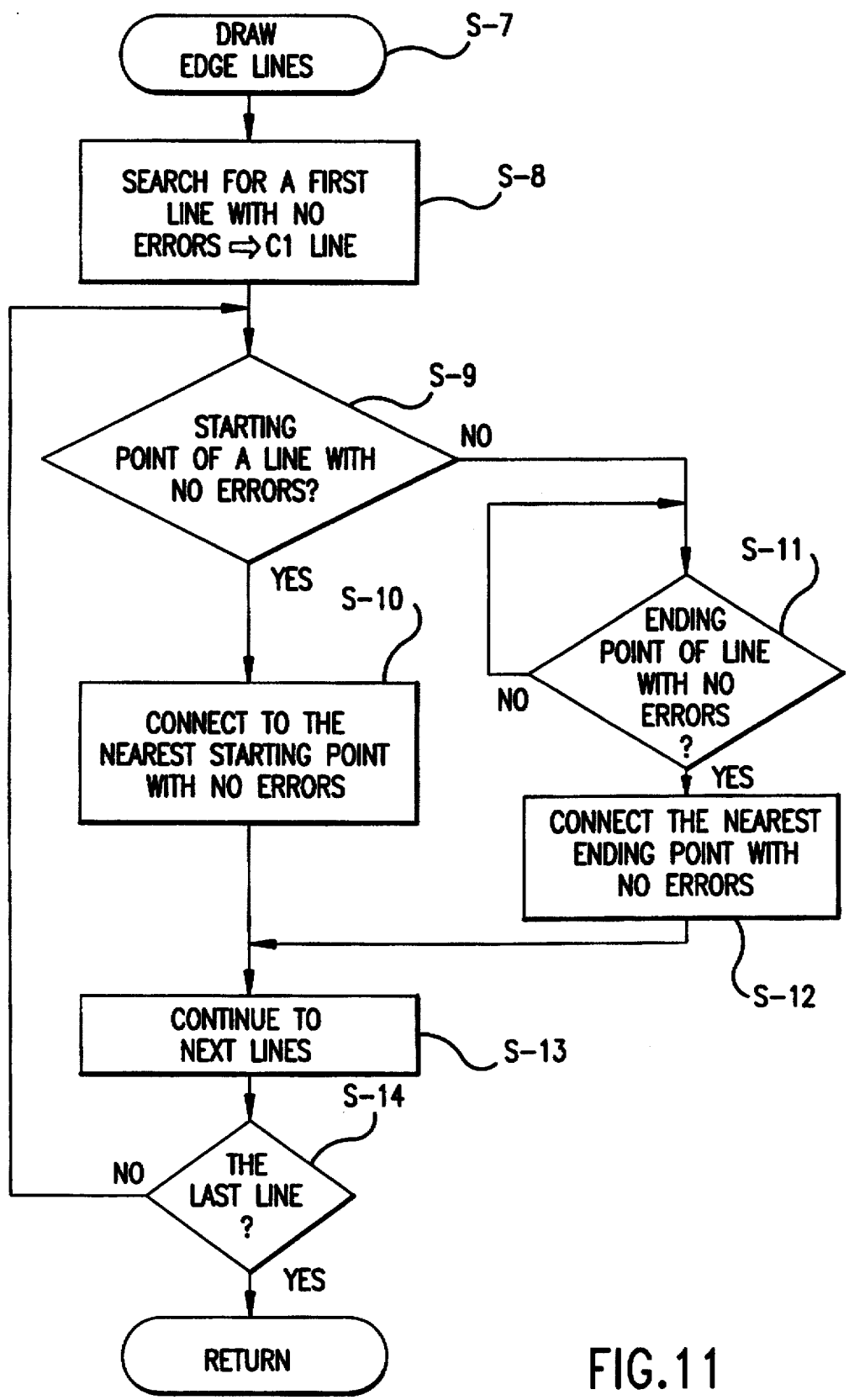
FIG. 11 is a flow chart explaining an edge line connection of FIG. 5.

The way to draw edge lines is to be explained below, referring to FIG. 11. (S-7) The first line transmitted thereto from the memory part 15 and having no errors is detected. (S-8)

And, detecting each starting points and each ending points of the subsequently detected lines thereafter, the lines are connected by connecting a starting point to other starting point and an ending point to other ending point together. (S-9)

When the center line 13 is found utilizing the lines 11 and 12 having come out by connecting as foregoing description, as the form of the track can be foreseeable, and the data of the track analyzed in the linearity analyzing part 17 can be displayable on a display means, an overall outline of a tape can be understood.

As seen in foregoing description, this invention has advantages of providing a possibility for direct tracking in restoration of images as well as simplified logic circuit by, without any addition of digital processing circuit in reproduction of a recording, correcting on detecting the presence of tracking errors of recording/reproduction signals due to variation of tracking, and using the amount of errors obtained by adding different weightings to each of error value according to the corrected error value in the tracking control.

Also, this invention has advantages of providing possibilities of precise detection of the linearity between a rotating head and a recording medium as well as easy understanding of overall outline of a recording medium, by recording data error correction codes having been added thereon, and, in reproduction, analyzing the errors of the error correction codes recorded on a recording medium while varying the tracking of the recording medium.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An automatic tracking control device of a digital video cassette tape recorder comprising:

a pre-amplification means for amplifying reproduction signals scanned at a rotating head of a head drum to any level in reproduction;

a modulation and demodulation means for restoring amplified reproduction signals in the pre-amplification means into digital signals;

a format and deformat means for arraying the digital signals restored in the modulation and demodulation means to an original digital signal;

an error correction means for correcting errors in the output data arrayed by the format and deformat means according to the correction result, detecting the type of errors within a few seconds and generating correctable and incorrectable control signals according to the rate of errors detected; and an automatic tracking control means for controlling the tracking through a servo system by generating tracking data according to the rates of error obtained through addition of different weightings to each of the control signals transmitted thereto from the error correction means;

said automatic tracking control means including a first, a second and a third counter means for counting the control signals having no errors, having errors but correctable and having errors incorrectable of the error correction means, a weighting addition part for making the difference between the counter number of incorrectable errors, correctable errors and non-errors larger than they really are by adding a larger weighting value to the outputting value of each counter, a tracking selection means for selecting least error portions of the outputting value of said weighting addition part.

2. The automatic tracking control device as claimed in claim 1, wherein, in recording, the error correction means corrects errors of the digital signals, the format and deformat means and the modulation and demodulation means modulates the corrected signals into analogue signals, and the pre-amplification means amplifies the modulated signals and records on a tape through a video head and an audio head.

3. The automatic tracking control device as claimed in claim 1, wherein the automatic tracking control means includes a first, a second and a third counter means for counting after synchronizing to each vertical synchronizing signal, and a digital automatic tracking process means for processing counted values in the first to the third counter means and transmit as tracking data therefrom.

4. The automatic tracking control device as claimed in claim 3, wherein the digital automatic tracking process means includes addition means for transmitting after adding the error signals weightings having been added thereon in a first to a third weighting addition means and transmitting therefrom, and a tracking selection means for selecting tracking data according to a rate of error added thereon in the addition means and transmitting to a servo system therefrom.

* * * * *